United States Patent
Nguyen

Patent Number: 5,892,851
Date of Patent: Apr. 6, 1999

[54] PARALLELIZED ERROR DIFFUSION

[75] Inventor: Hugh P. Nguyen, San Jose, Calif.

[73] Assignee: Hewlett-PAckard Company, Palo Alto, Calif.

[21] Appl. No.: 862,236

[22] Filed: May 23, 1997

[51] Int. Cl.$^6$ .................................................. H04N 1/405
[52] U.S. Cl. .......................... 382/252; 382/237; 382/270; 382/304; 358/456; 358/466
[58] Field of Search .................................... 382/252, 237, 382/270, 304; 358/456, 457, 458, 465, 466, 298, 534, 536, 535; 359/109

[56] References Cited

U.S. PATENT DOCUMENTS

5,604,605  2/1997  Moolenaar .............................. 358/456

*Primary Examiner*—Scott Rogers

[57] ABSTRACT

A process and apparatus is described to improve error diffusion halftone imaging by reducing the amount of time necessary to perform the halftoning process. This processing time reduction is produced without sacrificing the quality of the output binary images by achieving parallelism of error diffusion within an image row. The method works by cutting each image row into a number of segments and error diffusing these segments in parallel. It utilizes two different error diffusion filters: the cut filter for the pixel just before the cuts and the normal filter for the rest of the pixels. Dependencies among the segments is eliminated by ensuring that the cut filter has zero weight for the right neighboring pixel. The normal filter can be any filters that can show excellent quality of the output binary images. Banding artifacts along the cuts are minimized through careful design of the cut filter. The artifacts can also be subdued by using different positions of the cuts for different image rows, by using different cut filters for different rows, or by adding noise to the two pixels on both sides of the cuts. Alternately, a cut filter is employed that can eliminate the banding effects completely, in the majority of cases. In this design, many possible filters are evaluated and the best ones are chosen systematically. Furthermore, in the new method, the data are within an image row, and hence can be quickly rearranged to a form that will speed up parallel processing in a Single Instruction Multiple Data architecture such as the Intel MMX architecture.

22 Claims, 7 Drawing Sheets

PARALLELIZED ERROR DIFFUSION

BACKGROUND OF THE INVENTION

1. Field of the Invention

The present invention relates to digital image processing and, more particularly, to processing continuous-tone images into halftone images.

2. Description of the Related Art

Digital Halftoning is the process of transforming a continuous-tone image into a binary image that has the illusion of the original continuous-tone image. Error diffusion is one important class of digital halftoning algorithms that renders the continuous-tone images by thresholding their gray levels and distributing the errors due to the thresholding to the neighboring unprocessed pixels. See, R. Ulichney, Digital Halftoning, p. 239, MIT Press, Cambridge, Mass., 1987.

Figure 1:
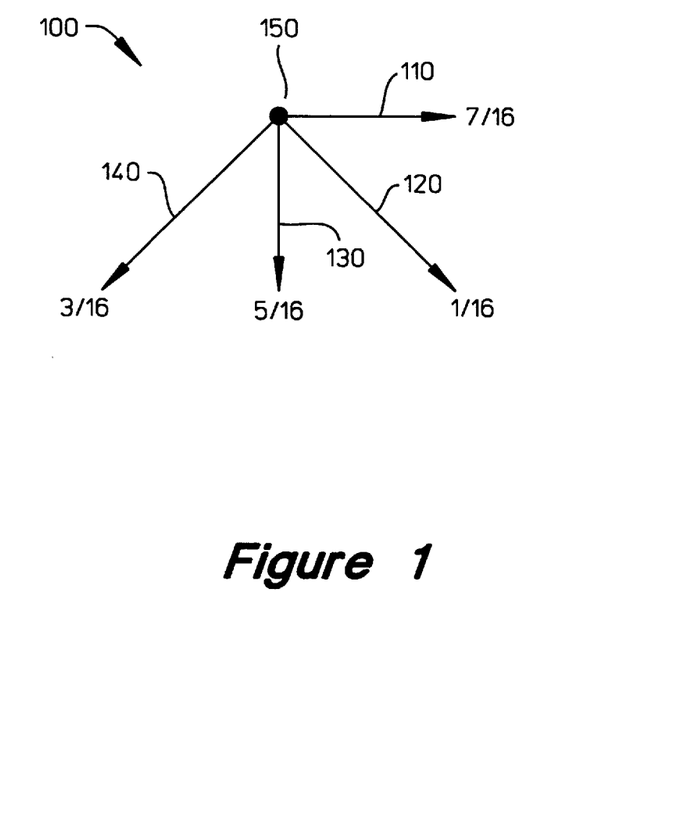
FIG. 1 is a drawing illustrating a Floyd and Steinberg error diffusion filter suitable for use as a normal filter according to the present invention.

The set of "weights" used to distribute the error when performing error diffusion is called the error diffusion filter. For example, the standard Floyd and Steinberg filter 100 contains four weights, 110, 120, 130 140, applied to diffuse error to pixels neighboring the pixel at location 150, as shown in FIG. 1. See, R. W. Floyd and L. Steinberg, "An Adaptive Algorithm for Spacial Grey Scale," Proc. SID, vol. 17/2, pp. 75–77, 1976.

There are many error diffusion filters reported in the literature. Some other examples are J. F. Jarvis, C. N. Judice and W. H. Ninke, "A Survey of Techniques for the Display of Continuous-tone Pictures on Bilevel Displays," Computer Graphics and Image Processing, vol. 5, pp. 13–40, 1976; P. Stucki, "MECCA—Multiple—error Correcting Computation Algorithm for Bilevel Image Hardcopy Reproduction," Research Report RZ1060, IBM Research Laboratory, Zurich, Switzerland, 1981; R. L. Stevenson and G. R. Arce, "Binary Display of Hexagonally Sampled Continuous-tone Images," J. Opt. Soc. Am. A, vol. 2, no. 7, pp. 1009–1013, 1985; and P. W. Wong, "Adaptive Error Diffuision and its Application in Multiresolution Rendering, IEEE Transactions on Image Processing, vol. 5, pp. 1184–1196, July 1996.

Although there are many different error diffusion halftoning techniques, they all suffer from the common defect that they take a non-trivial amount of time to process a continuous-tone digital image. This is because an error diffusion filter is typically applied sequentially to each pixel within the continuous-tone image.

In the case of color images, the halftone processing time is further increased over that of the gray level halftone processing time. This is because separable error diffusion is usually performed when halftoning a color image. During the separable error diffusion process, the color continuous-tone image is first separated into separate color channels. Separate error diffusion halftones are then formed for each of the color channels. Hence, in the typical case where there are three color channels, separable error diffusion halftoning will take at least three times longer to perform than would be the case if error diffusion were performed on a gray level continuous-tone image having the same number of pixels.

Thus, it can be seen that sequential processing burdens associated with error diffusion halftone imaging techniques impose output speed limits upon halftone image output devices, and hinder the use of these devices in many applications.

Therefore, there is an unresolved need for a technique that can improve error diffusion halftone imaging by reducing the amount of time necessary to perform the halftoning process.

SUMMARY OF THE INVENTION

A process and apparatus is described to improve error diffusion halftone imaging by reducing the amount of time necessary to perform the halftoning process. This processing time reduction is produced without sacrificing the quality of the output binary images by achieving parallelism of error diffusion within an image row.

The method works by cutting each image row into a number of segments and error diffusing these segments in parallel. It utilizes two different error diffusion filters: the cut filter for the pixel just before the cuts and the normal filter for the rest of the pixels. Dependencies among the segments is eliminated by ensuring that the cut filter has zero weight for the right neighboring pixel. The normal filter can be any filters that can show excellent quality of the output binary images.

Banding artifacts along the cuts are minimized through careful design of the cut filter. The artifacts can also be subdued by using different positions of the cuts for different image rows, by using different cut filters for different rows, or by adding noise to the two pixels on both sides of the cuts.

Alternately, a cut filter is employed that can eliminate the banding effects completely, in the majority of cases. In this design, many possible filters are evaluated and the best ones are chosen systematically.

Furthermore, most parallel processing architectures execute data faster if the data to be processed in parallel are adjacent in the memory. The input data, the output data, the error data, and the threshold data are spread between image rows in traditional error diffusion. As a result, it is difficult and time consuming to make the data adjacent in the memory. In the new method, the data are within an image row, and can be quickly rearranged to a form that will speed up parallel processing.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

Embodiments of the invention are discussed below with reference to FIGS. 1–8. Those skilled in the art will readily appreciate that the detailed description given herein with respect to these figures is for explanatory purposes, however, because the invention extends beyond these limited embodiments.

Figure 2:
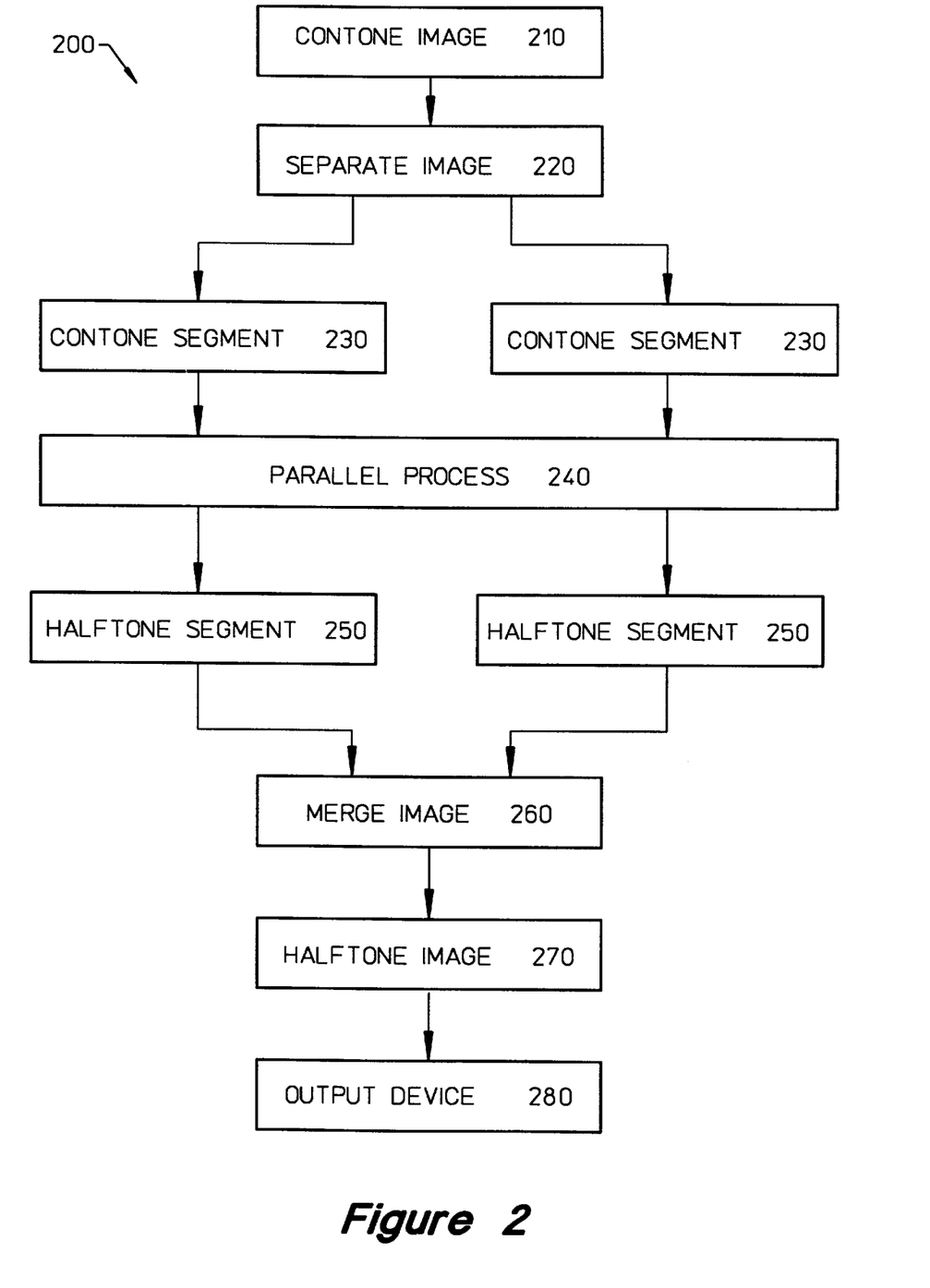
FIG. 2 is a block diagram illustrating an embodiment of error diffusion parallel processing according to the present invention.

FIG. 2 is a block diagram illustrating an embodiment of error diffusion parallel processing according to the present invention. In FIG. 2, parallel halftoning processor 200 operates on contone (i.e., continuous tone) image 210 to form halftone image 270, which is then output on output device 180.

The operation of parallel halftoning processor 200 will be discussed below in further detail. Briefly stated, however, separator 220 separates contone image 210 into contone segments 230. Parallel processor 240 then operates on contone segments 230 in parallel to form a corresponding set of halftone segments 250. Merging unit 260 then merges the halftone segments 250 together to form halftone image 270.

Error diffusion algorithms exhibit parallelism between image rows. For example, FIG. 2 shows that with the Floyd and Steinberg error diffusion, all pixels on a diagonal with pixels 320, 330, 340 and 350 in contone image 210 can be processed in parallel. The diagonal constraint occurs because when filter 100 is applied to pixel 310, error diffusion information will be calculated for pixels 330, 340, 360 and 370. Some of this error diffusion information will be required to apply filter 100 to pixel 340. Thus, pixel 340 cannot be processed until completion of processing of pixel 310.

Figure 3:
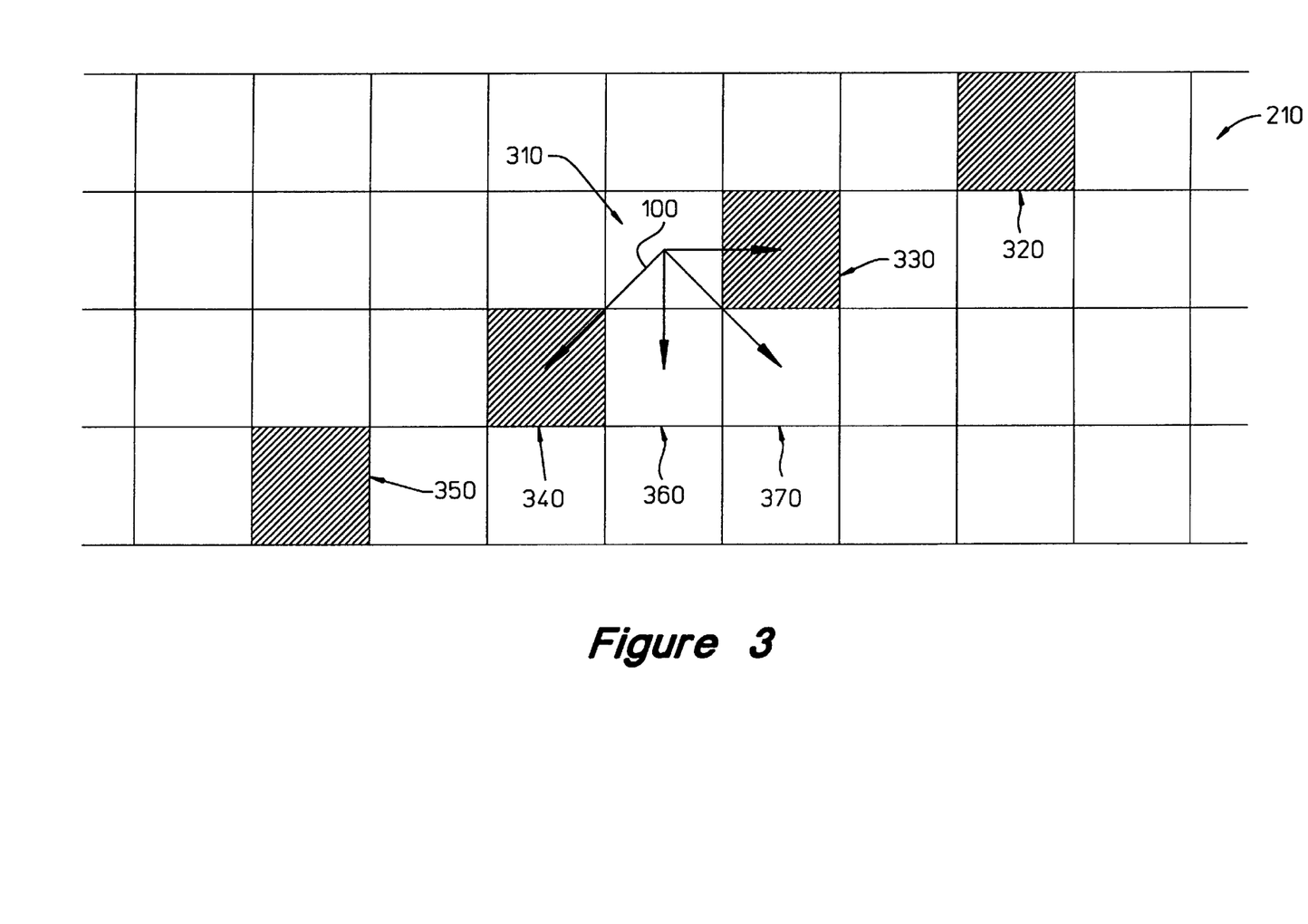
FIG. 3 is a drawing illustrating the parallelism of Floyd and Steinberg error diffusion.
Figure 4:
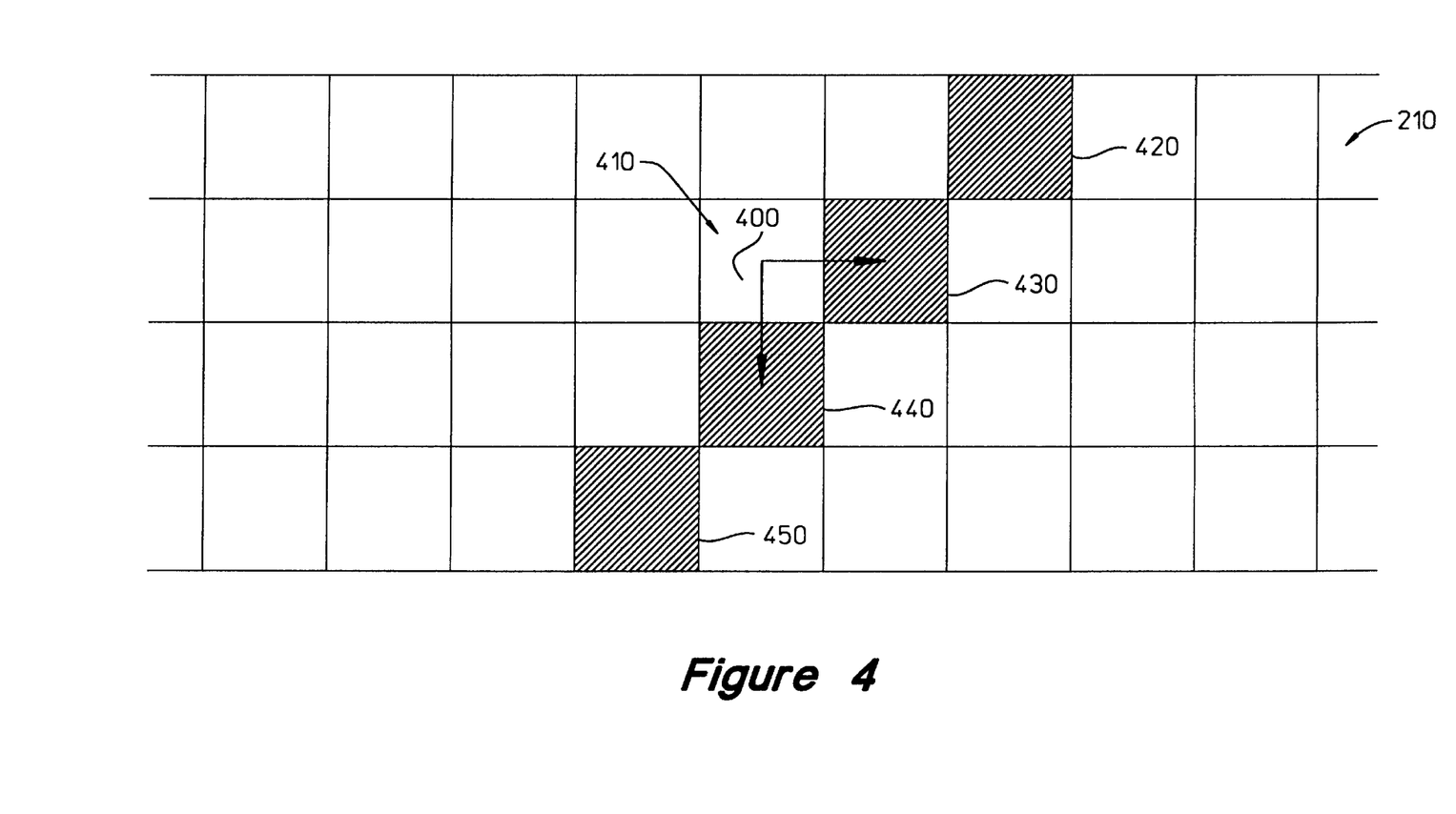
FIG. 4 is a drawing illustrating the parallelism of two-term error diffusion.

Similarly, FIG. 3 shows that with the two term error diffusion, all pixels on a diagonal with pixels 420, 430, 440 and 450 in contone image 210 can be processed in parallel. Again, the diagonal constraint occurs because when filter 100 is applied to pixel 410, error diffusion information will be calculated for pixels 430 and 440. Some of this error diffusion information will be required to apply filter 100 to pixel 440. Thus, pixel 440 cannot be processed until completion of processing of pixel 410.

The parallelism of error diffusion makes it suitable for the Single-Instruction-Multiple-Data (SIMD) architectures such as the Intel Architecture MMX technology (MMX is a trademark of Intel Corporation, Santa Clara, Calif.). See, Intel Corporation, "Intel Architecture MMX Technology—Programmer's Reference Manual," Intel Corporation, 1996. Unfortunately, most implementations of error diffusion do not buffer the whole image; therefore, the parallelism is limited by the number of rows that are buffered.

Theoretically, one can obtain the parallelism of the error diffusion within an image row by using an error diffusion filter that has zero weight for the right neighboring pixel. With such a filter, all pixels in any given image row can be processed in parallel. However, experiments show that the weight for the right neighboring pixel is so important that setting it to zero will make output binary images unacceptable.

This invention proposes a method to achieve the parallelism of the error diffusion within an image row without sacrificing the quality of the output binary images. The method works by cutting each image row into a number of segments and error diffusing these segments in parallel. It utilizes two different error diffusion filters: the cut filter for the pixel just before the cuts and the normal filter for the rest of the pixels. The cut filter must have zero weight for the right neighboring pixel in order to eliminate the dependencies among the segments. The normal filter can be any filters that can show excellent quality of the output binary images.

Figure 5:
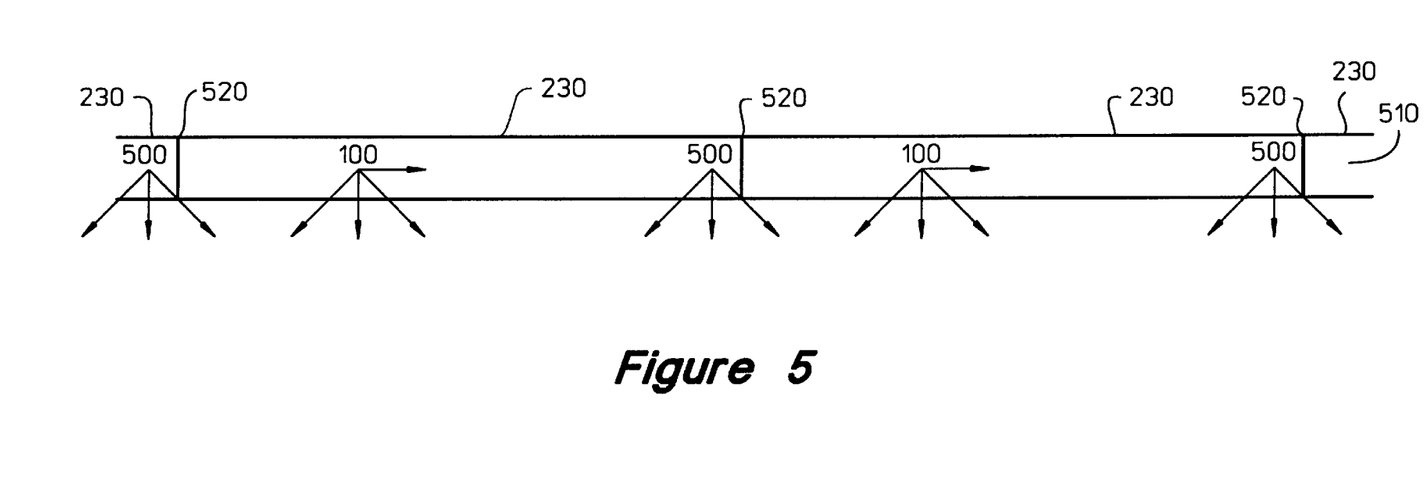
FIG. 5 is a drawing illustrating application of a four-term normal filter and a three-term cut filter as practiced according to one embodiment of the present invention.

FIG. 5 is a drawing illustrating application of a four-term normal filter and a three-term cut filter as practiced according to one embodiment of the present invention. FIG. 5 shows a portion of a row 510 from a contone image. Row 510 has been segmented at cuts 520 into at least four contone segments 520. A three-weight filter 500 is applied as the cut filter to the end pixels adjacent and to the left of cuts 520. A four-weight filter 100 is applied as the normal filter to the rest of the pixels within contone segments 230.

Experiments show that if the cut filter is not carefully designed, there will be banding artifacts along the cuts. The artifacts can be subdued by using different positions of the cuts for different image rows, by using different cut filters for different rows, or by adding noise to the two pixels on both sides of the cuts.

These practices certainly reduce the banding artifacts. Alternately, in the majority of cases, the banding effects can be eliminated completely through careful selection of a cut filter. In this design scheme, many possible filters are evaluated and the best ones are chosen systematically.

Figure 6:
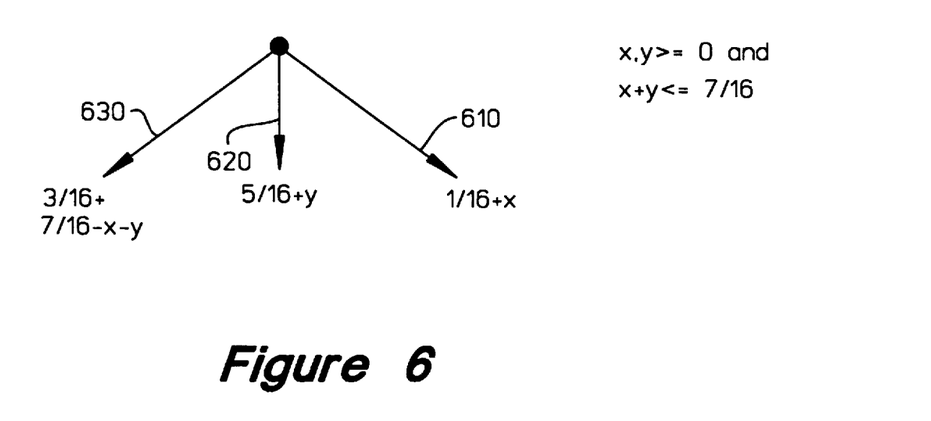
FIG. 6 is a drawing illustrating a possible set of cut filters, similar to the Floyd and Steinberg filter, as practiced according to one embodiment of the present invention.

Though this invention does not have any limitation on the cut filters except that the weight for the right neighboring pixel must be zero, it suggests the use of a cut filter similar to the normal filter. One way to do this is to redistribute the existing weight of the right neighboring pixel to the other weights. For example, FIG. 6 is a drawing illustrating a possible set of cut filters similar to the Floyd and Steinberg filter as practiced according to one embodiment of the present invention. Thus, FIG. 6 shows a set of possible cut filters 600 that are similar to the Floyd and Steinberg filter 100. In this example, the weight 7/16 for the right neighboring pixel in the Floyd and Steinberg filter is redistributed as x to the lower right pixel 610, y to the lower pixel 620, and the rest to the lower left pixel 630.

To evaluate the cut filters, it is preferred to have a metric to rank these filters. Because the banding artifacts are the only serious problems caused by the cut filters, this invention proposes a metric that assigns each cut filter a quality index that relates to the severeness of the banding artifacts. Here are the steps A through D for one embodiment of a way to compute the quality index:

Step A. Because the banding artifacts are more visible in uniform or near uniform areas, this step creates 256 images of uniform gray levels ranging from 0 to 255. Each image is then error diffused using the target normal filter and the candidate cut filter.

Step B. Because the banding artifacts usually occur with more dots on one side of the cuts and fewer dots on the other side, one can estimate how visible the banding artifacts are by counting the dots on either side of the cut. From the number of dots and the total number of pixels, one can obtain the perceived gray level of all the banding artifacts on one side of the cuts. The closer this perceived gray level is to the actual gray level, the less visible the banding artifacts are. For one embodiment, the quality index is defined to be the ratio of the perceived gray level and the actual gray level. The closer the quality index is to 1.0, the better the cut filter.

Step C. From step B, there are 256 quality indices, each for the one of 256 different gray levels. The overall quality index is a function of these indices. Because the banding artifacts are more visible in lighter areas, for one embodiment, the weights are made proportional to gray levels. Finally, the overall quality index can be normalized to [0,1].

Step D. The best cut filter is the one that has the overall quality index closest to 1 and passes the stop condition in which no individual quality index is far away from 1.

ADVANTAGES

This invention has several advantages over the traditional error diffusion method. It harnesses a higher degree of parallelism; therefore, has a better speed improvement on the SIMD architectures.

Furthermore, the lack of parallelism within an image row makes the traditional error diffusion unsuitable to be implemented on the SIMD architectures with limited buffer memory. The new method does not have that limitation.

Moreover, most SIMD architectures execute data faster if the data to be processed in parallel are adjacent in the memory. In traditional error diffusion, the input data, the output data, the error data, and the threshold data are spread between image rows. As a result, it is harder to make them adjacent in the memory for the traditional method. In the new method, the data are within an image row, and hence can be rearranged easier.

An Example Implementation

The present invention can be implemented in any SIMD architecture and in any parallel processing architecture in general. In theory, if adequate parallel processing hardware is available, all segments of all rows for all channels of a color image can be processed simultaneously in parallel. However, it is anticipated that for most implementations, hardware availability limitations will place a constraint upon the amount of parallelism that can be achieved. The following will discuss issues encountered when implementing an embodiment of the present invention within the Intel MMX architecture.

For one embodiment, each image row to be processed is extended so that the number of pixels is divisible by 64 (alternately 128). Each image row is cut into eight (alternately 16) segments. All segments of the row are then error difflused in parallel using two-term normal and cut filters. For one embodiment, the normal filter is weighted 0.5 to the right and 0.5 down; the cut filter is weighted 1.0 down and 0.0 down-and-to-the-right. The error diffusion is bidirectional with no offset cutting pattern. Extra pixels added to make the number of pixels evenly divisible are discarded after the row is processed.

The Intel architecture MMX technology has 57 new opcodes and one new 64-bit quadword data type. It is a single instruction multiple data architecture that can process eight bytes (eight by eight bit), four words (four by 16-bit) or two double-words (two by 32-bit) of data in parallel. It uses eight new 64-bit registers (that are the mantissa portion of existing 80-bit floating point registers). Parallelism includes support of SIMD opcodes and support of multiple execution units and multiple MMX processors.

For one embodiment, to optimize for the MMX architecture, variables are converted from words to bytes. Because conditional branches are not supported by the MMX instruction set, conditional branches are eliminated from the error diffusion code. For example, the conditional branch:

if $(a>b)c=d;$ can be implemented without conditional branches as:

$c+=((a>b)\&0\times1)*(d-c);$

Similarly, the conditional branch:

```
if (a>b) {
    raster | = 0x80;
    a -= 255;
}
``` can be implemented without conditional branches as:

$b=a>b;$ raster $|=0\times80\&b;$ $a-=b;$ // $b$ is a byte-variable

When bytes are stored in consecutive memory addresses, loading from MMX memory is faster than loading from non-MMX memory. This aspect of the MMX architecture places limitations upon the amount of processing speed improvement that can be achieved when processing rows in parallel using schemes as described in connection with FIGS. 3 and 4. This is because required data is ill-structured for such implementations. Thus, one cannot fully exploit the benefits of loading from MMX memory. Alternately, one must perform a large amount of time-consuming processing to place the data so that required bytes are stored in consecutive memory addresses to be loaded into MMX memory.

On the other hand, when segments of a row are processed in parallel using standard and cut filters, bytes can be stored in consecutive memory addresses to be loaded into MMX memory with a minimum of pre-processing. Four types of data are required to perform error diffusion ion parallel segments of a row: input data from the contone segments, output data for the halftone segments, error data and threshold data.

Figure 7:
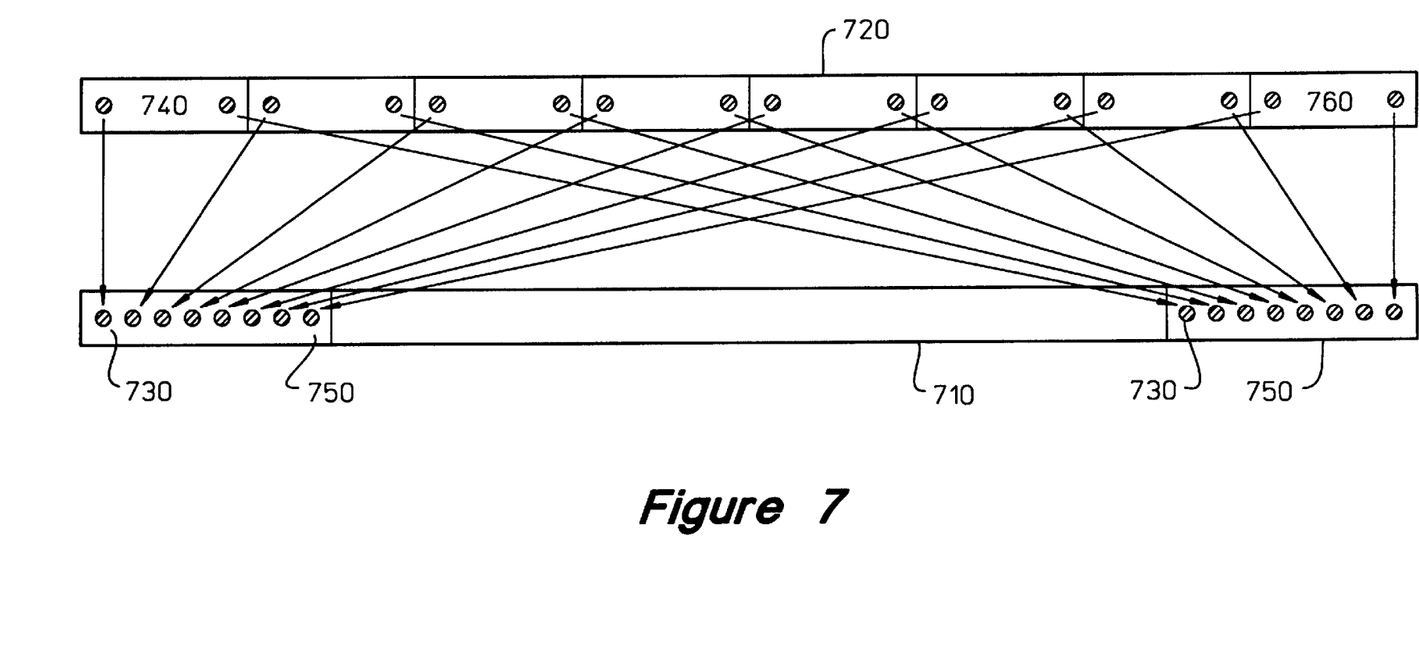
FIG. 7 is a drawing illustrating how error data can be arranged consecutively during error diffusion to facilitate parallel processing as practiced according to one embodiment of the present invention.

FIG. 7 is a drawing illustrating a how error data can be arranged consecutively during error diffusion to facilitate parallel processing as practiced according to one embodiment of the present invention. Error data 710 would normally be stored in the same sequence as the corresponding pixels in the contone row. However, to facilitate processing when using the MMX architecture, the error data are grouped 720 based upon pixel position within a segment. For example, the error data corresponding to the first pixel 730 in each of the segments of the row are grouped together 740. That way, when the normal filter is applied simultaneously to each of the first pixels of each of the contone segments of the row, all of the error data for the first pixels can be transferred into MMX registers using a single load instruction. Similarly, the error data corresponding to the last pixel 750 in each of the segments of the row are grouped together 760. That way, when the cut filter is applied simultaneously to each of the last pixels of each of the contone segments of the row, all of the error data for the last pixels can be transferred into MMX registers using a single load instruction.

Figure 8:
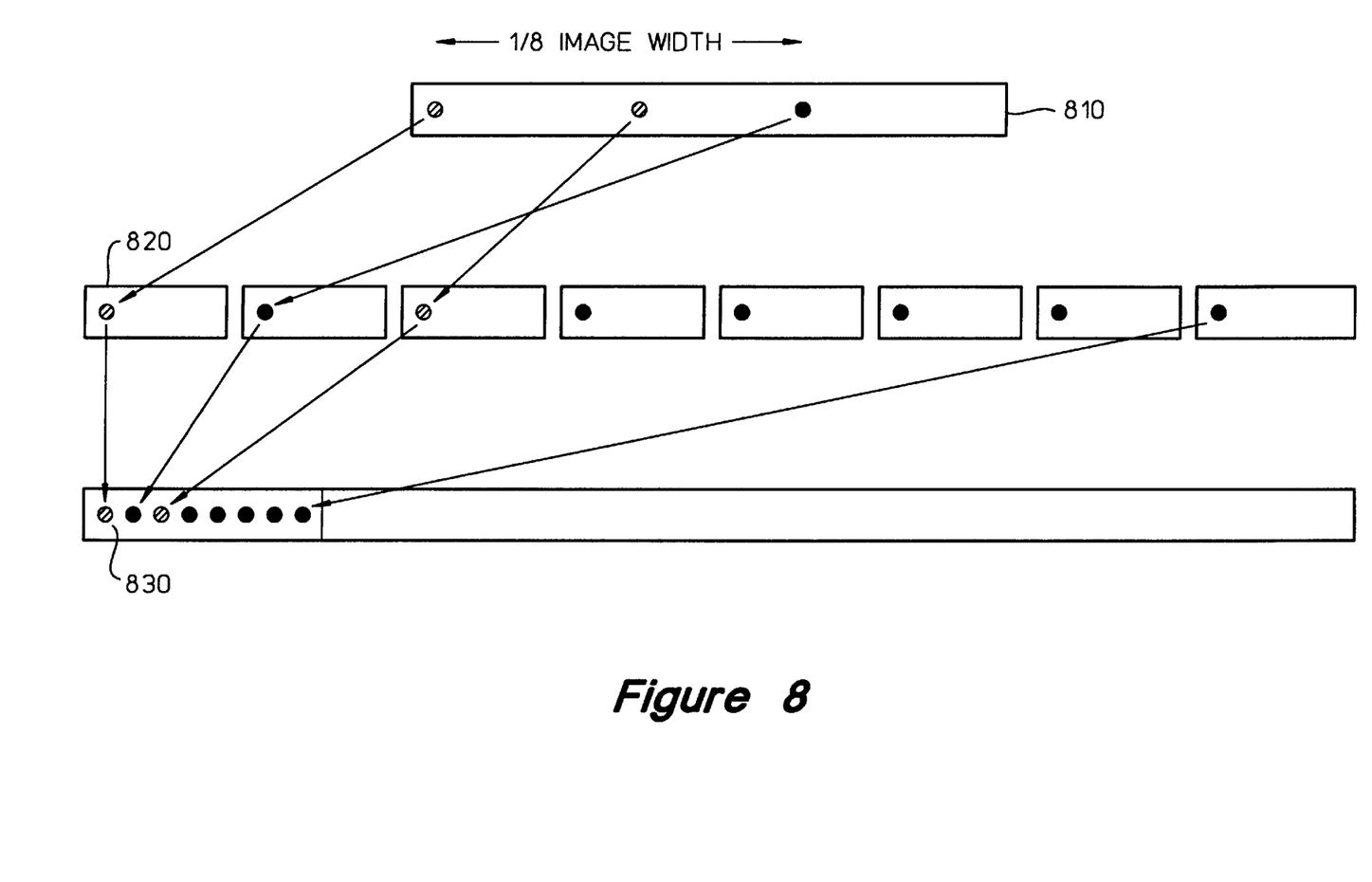
FIG. 8 is a drawing illustrating how threshold data can be arranged to facilitate parallelized error diffusion as practiced according to one embodiment of the present invention.

FIG. 8 is a drawing illustrating a how threshold data can be arranged to facilitate parallelized error diffusion as practiced according to one embodiment of the present invention. A single threshold table can be built once prior to halftoning. First a threshold table 810 for a single contone segment is constructed. Next the threshold data is replicated so that the threshold data for a particular pixel position within a segment is reproduced as many times as there are segments within the row to be processed simultaneously and grouped together. For example, the threshold data corresponding to the first pixel 830 in each of the segments of the row are grouped together 820. That way, when the normal filter is applied simultaneously to each of the first pixels of each of the contone segments of the row, all of the threshold data for the first pixels can be transferred into MMX registers using a single load instruction.

Furthermore, for the case of separable error diffusion of a color image, input data can be rearranged to be separated by channel during plane separation. Of course, the output data is then unpacked.

The many features and advantages of the invention are apparent from the written description and thus it is intended by the appended claims to cover all such features and advantages of the invention. Further, because numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A process for halftoning a contone image to form a halftone image, the process comprising the steps of:

dividing a contone row of the contone image into a plurality of contone segments, each of the contone segments having an end pixel and other pixels;

forming in parallel a plurality of halftone segments from the plurality of contone segments, for each of the contone segments, a corresponding halftone segment being formed by applying a cut filter to the end pixel and applying a normal filter to the other pixels; and merging the plurality of halftone segments to form a halftone row of the halftone image.

2. The process as set forth in 1, including the step of grouping error data to facilitate forming the plurality of halftone segments in parallel.

3. The process as set forth in 2, wherein the error data are grouped such that the error data corresponding to pixels having similar locations within the contone segments of the contone row are grouped together.

4. The process as set forth in 1, including the step of grouping threshold data to facilitate forming the plurality of halftone segments in parallel.

5. The process as set forth in 4, wherein the threshold data are grouped such that the threshold data corresponding to pixels having similar locations within the contone segments of the contone row are grouped together.

6. The process as set forth in claim 1, wherein the contone image is a gray scale image.

7. The process as set forth in claim 1, wherein the contone image is a color image having a plurality of channels and the halftone image is formed for one of the channels.

8. The process as set forth in 1, wherein contone segments are formed differently for adjacent rows of the contone image so that the contone segment end pixels are staggered.

9. The process as set forth in 1, wherein different cut filters are applied to the end pixels of the contone segments for adjacent rows of the contone image.

10. The process as set forth in 1, wherein noise is added to a neighbor pixel of the end pixel when forming the contone segments.

11. The process as set forth in 1, wherein the cut filter is selected from a plurality of candidate cut filters by separately applying the plurality of candidate cut filters to a series of constant tone images as set forth in claim 1 and selecting the candidate cut filter that reduces banding according to a predetermined metric.

12. A processor for halftoning a contone image to form a halftone image, the processor comprising:

means for dividing a contone row of the contone image into a plurality of contone segments, each of the contone segments having an end pixel and other pixels;

means for forming in parallel a plurality of halftone segments from the plurality of contone segments, for each of the contone segments, a corresponding halftone segment being formed by applying a cut filter to the end pixel and applying a normal filter to the other pixels; and means for merging the plurality of halftone segments to form a halftone row of the halftone image.

13. The processor as set forth in 12, including means for grouping error data to facilitate forming the plurality of halftone segments in parallel.

14. The processor as set forth in 13, wherein the error data are grouped such that the error data corresponding to pixels having similar locations within the contone segments of the contone row are grouped together.

15. The processor as set forth in 12, including means for grouping threshold data to facilitate forming the plurality of halftone segments in parallel.

16. The processor as set forth in 15, wherein the threshold data are grouped such that the threshold data corresponding to pixels having similar locations within the contone segments of the contone row are grouped together.

17. The processor as set forth in claim 12, wherein the contone image is a gray scale image.

18. The processor as set forth in claim 12, wherein the contone image is a color image having a plurality of channels and the halftone image is formed for one of the channels.

19. The processor as set forth in 12, wherein the contone segments are formed differently for adjacent rows of the contone image so that the contone segment end pixels are staggered.

20. The processor as set forth in 12, wherein different cut filters are applied to the end pixels of the contone segments for adjacent rows of the contone image.

21. The processor as set forth in 12, wherein noise is added to a neighbor pixel of the end pixel when forming the contone segments.

22. The processor as set forth in 12, wherein the cut filter is selected from a plurality of candidate cut filters by separately applying the plurality of candidate cut filters to a series of constant tone and selecting the candidate cut filter that reduces banding according to a predetermined metric.

* * * * *